E. B. MEAD.
BRAKE CONTROL.
APPLICATION FILED MAR 8, 1920.
1,373,195. Patented Mar. 29, 1921.
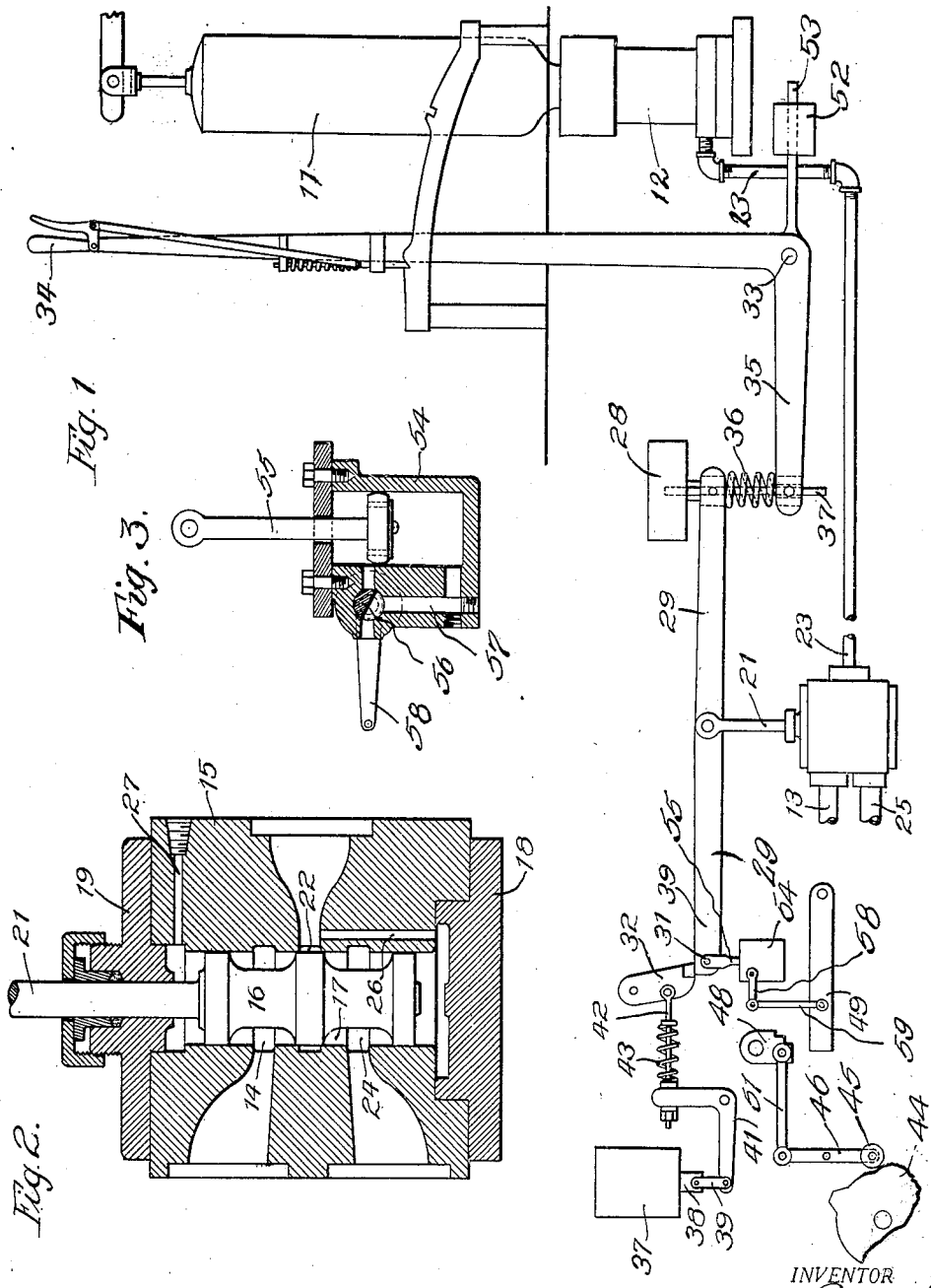

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

BRAKE CONTROL.

1,373,195.   Specification of Letters Patent.   Patented Mar. 29, 1921.

Application filed March 8, 1920. Serial No. 364,338.

*To all whom it may concern:*

Be it known that I, EZRA B. MEAD, a citizen of the United States, residing in Ottumwa, in the county of Wapello and State of Iowa, have invented a new and useful Improvement in Brake Controls, of which the following is a specification.

This invention relates in general to brake control mechanism and has more particular reference to mechanisms provided to control the brakes in mine hoists and the like. Hoists of this character are usually controlled by hoist engineers or other attendants located at a control station from which the cage is not visible throughout any or a large part of its travel. An indicator indicates the movement of the cage and shows its approach to a desired landing. The hoist engineer observes the indicator until the cage is almost at the landing then he shifts his attention to the drum which carries a painted spot to indicate accurately the desired position of rest. The braking may be accomplished either by hand actuated control or one actuated by power. Where the former is used the extent of braking action may be accurately estimated by the amount of force the operator exerts in pulling upon the brake lever. This form of brake control, however, requires the exertion of considerable effort by the operator. The power operated brake controls in use prior to my invention have been so constructed and arranged that accurate application of the brake at desired force and for desired periods has been difficult to obtain. The position of the brake in many power actuated brake controls has been determined by the position of the control member and since the brake blocks wear and must be reset at intervals the conditions of the brake means are continually changing with the result that the braking forces exerted at the various positions of the control are constantly altering.

Other types of power control in use are still less easily operated with accuracy. For example there is a type wherein a direct pressure valve is operated and the amount of braking force can only be guessed at from the cable movement. It is substantially impossible to accurately estimate the braking effect in this way since a considerable change of speed is necessary before the effect is apparent. That is to say, if the operator is braking too much he does not notice it until the cage has slowed so greatly that additional power is needed to make the landing.

A principal object of the invention is the provision of a power actuated brake control which will require the operator to exercise a variable amount of effort in the braking action, which effort while materially less than that required in a hand actuated control will in the fashion of said hand actuated control advise the operator at all times, and independently of changing conditions of his brake lock, of the extent of his braking action.

Another important object of the invention is the provision of a power actuated brake control wherein the position of the hand lever indicates accurately the amount of braking action regardless of wear of the brake shoes or of their adjustment to compensate for the wear.

A further object of the invention is the vision of a power actuated brake control wherein the force exerted by the operator upon the lever will bear a recognized relation to the braking force, which relation may be altered to suit the desire of the particular operator.

A further object of the invention is the provision of a power actuated brake control of new and improved form and adapted for effective operation by safety devices for preventing excessive speed forward, approaching the dump too rapidly, or starting the hoist in the wrong direction, etc.

A further object of the invention is the provision of a brake control which after application of the brake by any of the various safety devices will require a manual resetting to subsequent release of the hand lever, thus preventing resetting of the safety device with the brake in off position and inadvertent or premature descent of the cage.

Other objects and advantages of the invention will be apparent as it is better understood from the following description, which taken in connection with the accompanying drawings discloses a preferred embodiment thereof.

On the drawing,

Figure 1 is a diagrammatic view of a control embodying my present invention;

Fig. 2 is a section through the piston valve provided in the embodiment shown in Fig. 1; and Fig. 3 is a view showing the dash pot.

For the purpose of illustrating my present invention I have shown on the drawing in Fig. 1 a diagrammatic view of a power control in which it is embodied. The brake construction is not shown in detail on the drawing for it may be of any preferred form or construction.

A weight 11 is preferably provided to supply actual braking power. A thrust cylinder 12 is employed to lift the weight and release the brake. Fluid, preferably oil, under pressure is supplied to actuate the thrust cylinder and control the brake action. This fluid under pressure is supplied to the thrust cylinder as occasion requires from a source of fluid pressure which may be taken to be the delivery pipe 13. This pipe communicates with the port 14 at the top of a valve casing 15 in which moves a piston valve 16 in a valve chamber 17 closed at its bottom by closure 18 and at its top by stuffing box 19. The stem 21 of the valve extends out at the top. A port 22 intermediate the ends of the valve chamber is connected with the thrust cylinder by a conduit 23 and a lower port 24 is provided for an exhaust and connected with a sump (not shown) by a conduit 25. The valve has upper intermediate and lower enlarged parts in contact with the valve chamber walls and is adapted to connect the ports 14 and 22 or the ports 22 and 24. The ports preferably extend all the way around the valve chamber. A pass 26 is provided between the port 22 and the bottom of the valve chamber so that there is always pressure on the bottom of the valve equal to the pressure in the thrust cylinder. A port 27 connects with the top of the valve chamber so that there will be no pressure on the stuffing box.

The pressure on the bottom of the valve tends to lift the valve and this is restrained by a weight 28 carried upon the end of a lever 29 connected with the end of the valve stem 21. This lever is normally fulcrumed at 31 under a latch 32 which is actuated as part of the safety appliance, as will be later described. The weight 28 is sufficient to maintain the valve depressed and communication established between the fluid under pressure and the thrust cylinder. A hand lever of bell crank form is fulcrumed at 33 and a manipulative arm 34 extends up for operation by the hoist engineer. The other arm 35 extends forward under the weight 28 and a spring 36 is interposed between this arm and the weight, a guide rod 37 being provided.

Where it is desired to apply the brakes manipulative arm 34 is moved to the right, viewing Fig. 1, and upward movement of the arm 35 through the spring takes up some of the support of the weight 28. This permits the pressure of the fluid in the thrust cylinder to lift the valve and establish communication between the thrust cylinder and exhaust. This condition prevails until the pressure in the thrust cylinder is less than the pressure of the part of the weight not taken up by the bell crank when the valve is again moved down by the weight. This application of the brake is proportional to the degree of weight pressure lift and proportional also to the effort exerted on the hand lever by the operator. This pressure as will be readily apparent is inversely proportional to the pressure of the thrust cylinder. If the operator with greater pressure pulls back the hand lever he supports more of the weight and the brake pressure of course will increase.

It will be noted that each position of the operator's hand lever corresponds to a certain pressure of the brake shoes on the brake ring regardless of the adjustment of the brake shoes. Moreover it will be noted that as the operator applies the brake more and more due to the pressure of the spring 36 his pressure on the hand lever must increase so that both the position of the hand lever and by the effort it requires to hold the hand lever in that position he is conscious of the braking he is applying on his hoist.

The latch 32 is adapted to be withdrawn under the influence of the safety devices which are not shown on the drawing. A solenoid magnet 37 has an armature 38 connected by a link 39 with a bell crank lever 41 positioned in turn by a spring pressed rod 42 with the latch 32 and spring 43 pushing the latch toward the right viewing Fig. 1. When conditions arise that render automatic stopping of the cage desirable the solenoid is deënergized and the latch moved to the left. This releases the left hand end of the lever 39 and permits pressure beneath the valve to raise it. The action is the same as that resulting from the pulling back of the hand lever.

The rapidity with which the brakes are applied in this automatic action is determined by a cam 44 engaged by a roll 45 on a lever 46 connected by a link 51 with a swinging stop device 48 adapted for engagement by a lever 49. The cam moves the stop device to present stops at different heights of the lever 49 depending upon whether sudden or slow stopping is desired. A dash pot 54 is provided and the lever 29 is connected to its plunger stem 55. This dash pot is adapted to control the rate of brake application on emergency stop through the action of a valve 56 in the dash pot by-pass 57, this valve having an arm 58 connected by a link 59 with the lever 49. When the lever is moved up into engagement with one or the other of the stop faces of the stop device 48 the valve is opened in greater or less degree depending upon the position of the swinging stop device. The brakes having been automatically applied the control can only be released and reset by moving the hand lever to full braking position so that the end 31 of the lever 39 may be lowered sufficiently to permit resetting of the latch 32. This prevents resetting of the mechanism with the brake in off position and inadvertently allowing the cage to descend.

A counter weight 52 is provided riding upon an arm 53 and this counter weight may be moved in and out as the operator desires to permit him to govern the degree of pull he must exert on the hand lever.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A brake control, comprising in combination a brake applying power source for applying the brake, a control comprising a brake releasing power source, a manipulative device, a connection between said manipulative device and said brake releasing power source and actuated by said device, said connection maintaining a recognizable relation between the force exerted upon said device by an operator and the extent of braking action.

2. A brake control, comprising in combination, a brake applying power source for applying the brake, a control comprising a brake releasing power source, a manipulative device, a connection between said manipulative device and said brake releasing power source and actuated by said device, said connection maintaining a recognizable relation between the force exerted upon said device by an operator and the extent of braking action, and means for altering said relation.

3. A brake control, comprising in combination, a brake applying power source for applying the brake, a control comprising a brake releasing power source, a manipulative device, a connection between said manipulative device and said brake releasing power source and actuated by said device, said connection maintaining a proportion between the force exerted by the operator and the extent of braking action.

4. A brake control, comprising in combination, a brake applying power source for applying the brake, a control comprising a brake releasing power source, a manipulative device and connections between said manipulative device and said brake releasing source of power and actuated by said device, said device having positions corresponding to the braking pressure.

5. A brake control, comprising in combination, a brake applying power source for applying the brake, a control comprising a brake releasing power source, a manipulative device and connections between said manipulative device and said brake releasing source of power and actuated by said device, said device having progressive position corresponding to the progressive braking pressure.

6. A brake control, comprising in combination, a weight for applying the brakes, a thrust cylinder for lifting said weight to release the brakes, a source of fluid under pressure, a hand lever, and means for controlling the pressure of the fluid in the thrust cylinder whereby the amount of pressure corresponds to the position of the hand lever independently of wear of the brake shoes.

7. A brake control, comprising in combination, a weight for applying the brakes, a thrust cylinder for lifting said weight to release the brakes, a source of fluid under pressure, a hand lever, and means for controlling the pressure of the fluid in the thrust cylinder whereby the pressure is inversely as the pressure on the hand lever.

8. A brake control, comprising in combination a weight for applying the brakes, a thrust cylinder for lifting said weights to release the brakes, a source of fluid under pressure, a hand lever, a conduit between said source and thrust cylinder, a valve in said conduit, a manipulative device for controlling said valve, and safety means for moving said valve independently of the manipulative device, and connections between said safety and manipulative devices insuring arrangement of the manipulative device in brake set position prior to release of said safety device.

9. A brake control, comprising in combination a weight for applying the brakes, a thrust cylinder for lifting said weight to release the brakes, a source of fluid under pressure, a conduit between said source and said thrust cylinder, a valve in said conduit, a member normally pressing said valve to brake releasing position, and a plurality of means for relieving said pressure to permit application of the brakes, one of said means being manually controlled and the other automatically controlled.

10. A brake control, comprising in combination a weight for applying the brakes, a thrust cylinder for lifting said weight to release the brakes, a source of fluid under pressure, a conduit between said source and said thrust cylinder, a valve in said conduit, a member normally pressing said valve to brake releasing position, and a plurality of means for relieving said pressure to permit application of the brakes, one of said means being manually controlled and the other variably and automatically controlled.

11. A brake control, comprising a thrust cylinder normally maintaining the brakes released, a source of fluid under pressure communicating with said thrust cylinder, automatic devices for applying the brake, and means controlled by said automatic devices for varying the rate of application of said brake.

12. A brake control, comprising a thrust cylinder normally maintaining the brake released, a source of fluid under pressure normally connected with said thrust cylinder, a valve for cutting off communication between said source and said thrust cylinder and acting in such movement with the pressure in the thrust cylinder, and means governable by safety devices for interposing variable resistance to the action of said valve in amount less than the pressure in the thrust cylinder to produce braking.

13. A brake control, comprising a thrust cylinder normally maintaining the brake released, a source of fluid under pressure normally connected with said thrust cylinder, a valve for cutting off communication between said source and said thrust cylinder and acting in such movement with the pressure in the thrust cylinder, and a dash pot governable by safety devices for interposing variable resistance to the action of said valve in amount less than the pressure in the thrust cylinder to produce braking.

EZRA B. MEAD